Figure 1:
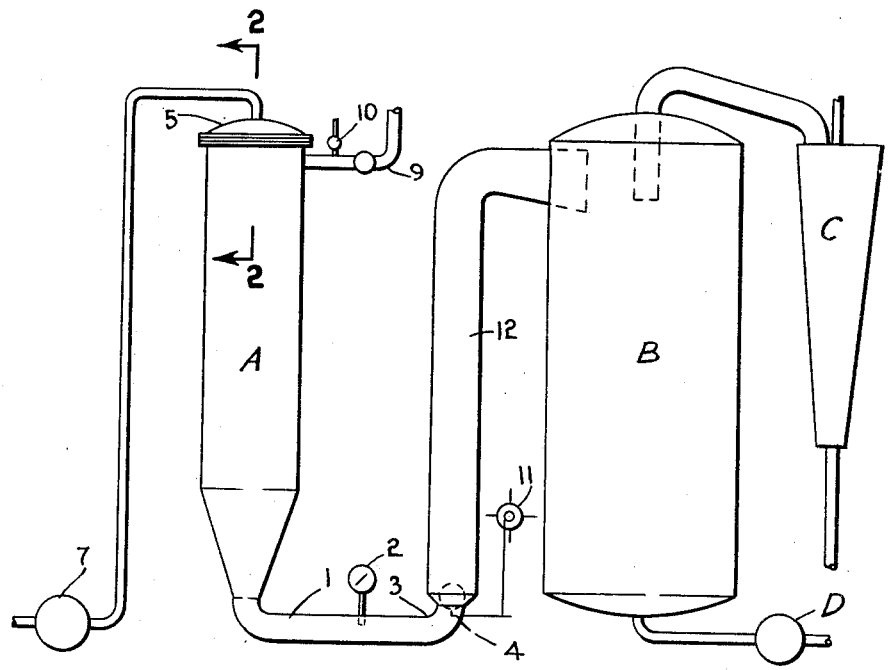

Jan. 23, 1951 H. L. MURRAY 2,539,264
METHOD OF PASTEURIZING, STERILIZING AND STEAM
DISTILLING POTABLE LIQUIDS
Filed April 27, 1948

Inventor:
H. L. Murray
By E. F. Wenderoth
Atty

Patented Jan. 23, 1951

2,539,264

UNITED STATES PATENT OFFICE 2,539,264

METHOD OF PASTEURIZING, STERILIZING, AND STEAM DISTILLING POTABLE LIQUIDS

Henry Lamont Murray, Auckland, New Zealand, assignor to Murray Deodorisers Limited, Auckland, New Zealand Application April 27, 1948, Serial No. 23,434
In New Zealand May 8, 1944

5 Claims. (Cl. 99—61)

Heretofore in the pasteurising, sterilizing and steam distillation of milk, cream, ice cream mix and other liquids which are likely to be injuriously affected by excessive heat (hereinafter referred to as "delicate liquids"), difficulties have not infrequently been encountered which have not been satisfactorily overcome by known methods of processing. Such difficulties are well known to those skilled in the art, but the following examples of a diverse nature may be taken as typical:

(1) Cream produced in certain districts is sometimes contaminated with vegetable substances which known methods of distillation with steam will not effectively remove without damaging or injuriously affecting the cream.

(2) Cream frequently contains spore-forming bacteria which spores the ordinary temperatures of pasteurization will not destroy or substantially weaken.

In the past, in an endeavour to substantially sterilize and steam distil delicate liquids, such for instance as milk cream and ice cream mixes, attempts have been made to apply thereto temperatures higher than their atmospheric boiling points, but the results have been unsatisfactory due to damage to the liquid, physical concussion resulting in fat losses in churning and impaired body and texture of butter, scorching and the inability to control satisfactorily the temperatures applied.

By the present invention, I have discovered how temperatures substantially above the atmospheric boiling point of the delicate liquid to be treated may be safely and advantageously applied to pasteurize, substantially sterilize and steam distil same under conditions so controlled as to ensure stabilization of temperature, substantial absence of harm. Thus, for instance, in the treatment of cream, temperatures ranging from about 212° Fahr. to say about 250° Fahr. can be safely applied. For other delicate liquids, proportionately high temperatures above their respective atmospheric boiling points may be employed, regard, however, being had to the innate delicacy of the liquid to be treated.

The invention comprises a method of pasteurizing, substantially sterilizing and steam distilling delicate liquids in which the liquid is subjected, while passing in diffused form through a pressure chamber so connected to a region of lower or substantially lower pressure as to enable the desired degree of lower pressure to be maintained in said region and the desired constant degree of pressure in said chamber, to the direct but gentle action of live steam which has, prior to contacting the liquid, first been adjusted in temperature to approximately the boiling point of water under the pressure within said chamber, said steam being applied to said liquid at a controlled and desired temperature and pressure above the atmospheric boiling point of the liquid being treated, said liquid after being raised to the desired temperature together with the excess portion of said steam being then allowed to escape into the region of lower or substantially lower pressure to complete distillation therein, an incidental function in such latter region being to deodorise the liquid.

The invention further consists in means for carrying out the abovementioned method.

The invention will now, however, be described with reference to one constructional embodiment of appropriate means for carrying the invention into effect, the liquid to be treated in this particular illustration being cream.

Figure 2:
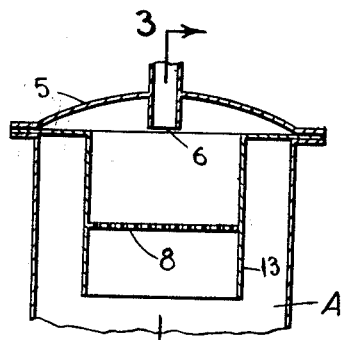
Figure 3:
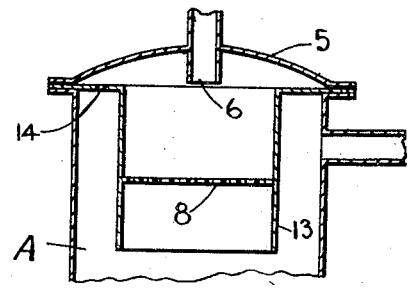

In the annexed sheet of drawings in which:

Figure 1 illustrates a suitable diagrammatic lay-out of a top portion of a suitable once-through apparatus, Figure 2 is a part vertical section of the pressure chamber on the line 2—2, Figure 1, and Figure 3 is a part vertical section through the top of the pressure chamber looking in the direction of the arrows 3—3, Figure 2.

A pressure heating chamber A, preferably of vertical cylindrical form, say thirteen inches in diameter by four feet six inches high, tapers near the bottom to form a horizontal outlet say three and a half inches in diameter. This outlet is fitted with a high temperature thermometer 2, and is connected to the uptake bend 3 and equilibrium valve 4 of a lower pressure apparatus such as is used in the vacuum pasteuriser sold under the United States registered trade-mark "Vacreator," in which B represents a region of lower or substantially lower pressure than obtains in the chamber A, C the condenser and D the discharge pump. As this apparatus is known, it is unnecessary to describe same in detail. The open top of the chamber is enclosed by a blank cover 5 clamped thereto and has attached an inlet port 6 for connection with a pump 7 supplying the liquid to be treated.

Suspended under the cover is a spray-pan or tray 8, preferably fitted with a skirt 13, the purpose of the tray being to catch the incoming flow of liquid and convert it into a spray or shower by allowing gravitation to draw the liquid through holes in the tray, while the skirt serves as a baffle during the expansion phase of the incoming steam. The size of the perforations is that which, while not fine enough to readily become fouled with deposit, will convert the liquid into drops sufficiently small to permit their becoming fully saturated by the heat of the surrounding steam during their brief descent.

A suitable aperture or apertures 14 is or are conveniently provided in the flange 15 of the spray-pan 8 opposite the steam entry to ensure a substantially balanced pressure above and below said spray-pan.

Adjacent to the top of the pressure heating chamber A is located a live steam inlet connection and stop valve 9. In the throat of this inlet on the discharge side of the valve is mounted a fine nozzle and needle valve 10 for the controllable injection of water into the incoming steam. The purpose of this humidifier is: When steam which contains no free moisture is reduced from a higher to a lower pressure and does no external work in the process, its total heat remains unchanged. As it is essential that the heat of the expanded steam must be made to conform to its new pressure (as otherwise burning of the milk solids is likely to occur), preferably a fine jet of water is introduced to the expanded steam and the excess heat of the steam is expended in converting the water into steam at the desired temperature.

In operation, the apparatus is assembled and a feed pipe connected from the liquid supply pump 7 to the inlet 6 of the pressure heating chamber A.

Water is turned on to the humidifier 10 and steam is admitted to the heating chamber A at the desired pressure above that of the atmosphere, the pressure being adjusted at the desired level by means of appropriate adjustment at 11 of the equilibrium valve 4—which also serves as a safety valve—at the base of the uptake pipe 12. The temperature will register on the high temperature thermometer 2.

Having started up the apparatus to which the pressure heater is attached, the liquid supply pump 7 is now put into commission, and the cream is supplied at a desired rate of flow to the pressure heater A. On entry, the liquid is caught in the spray-pan 8 and, purely by gravitation, is converted into a fine shower which rains down through the pressure steam. The extremely large surface in proportion to the weight of liquid exposed to the steam (approximately equivalent to a film one hundredth of an inch thick), occasions so rapid a transfer of heat that by the time the shower reaches the bottom of the heater the droplets have attained a temperature equal to the temperature of the steam, but without material harm either from excess heat or from physical abuse. The condensation of the steam occasions dilution.

The heated liquid and excess steam (which may be regulated in quantity as desired) now pass at a desired common temperature of say 228° Fahr. through the equilibrium valve 4 to a region of lower pressure B, and become subject to a sudden drop in pressure owing to the substantially lower pressure therein. This change induces an instant and violent ebullition coupled with the evolution of much vapor and a desired drop say, for example, of 50° Fahr. in temperature. This very considerable and sudden escape of stored heat from the liquid results in a much more effective removal of volatiles than has been achieved heretofore, without material harm to the liquid treated. The evaporation of moisture removes some of the dilution previously occasioned.

It will be understood that the invention is not limited to use with apparatus of the type disclosed. It is obvious that the pressure chamber could be linked with many other types of regions of lower pressure provided that means are provided for controlling the temperature and pressure in said chamber at the desired degree of difference from that obtaining in said region of lower pressure.

It will also be understood that in some cases saturated steam (if sufficiently wet) may obviate or partly obviate the need for the injected water.

It will, of course, also be understood that the steam must be introduced into the delicate liquid in such a manner as to avoid undue concussion. In other words, the steam must be gently intermingled with the diffused liquid.

Although the invention has been described with reference to a once-through process, it will be obvious, of course, that the invention would be applicable to either a batch process or a recirculatory process.

I claim:

1. A method of pasteurizing, sterilizing, and steam distilling potable liquids subject to harmful change by excessive heat content of steam which is admixed therewith, comprising, in a continuous process, gently and intimately intermingling the liquid to be treated with pre-treated steam in a first zone which is maintained at a selected super-atmospheric pressure and at a temperature which is equal to the boiling point of water at the selected pressure; preliminarily and before intermingling the steam with said liquid, adjusting the temperature of said steam by introducing into said live steam a requisite supply of water to absorb super-heat and thereby correct the temperature of said steam to that of boiling water at the selected operating pressure in said first zone; the gentle intermingling of the liquid and adjusted steam raising the temperature of the liquid undergoing treatment in said first zone to the temperature of said adjusted steam; and from said first zone, passing the liquid, together with any surplus steam entrained therein, into a second zone, maintaining said second zone under a pressure sufficiently lower than that maintaining in said first zone to produce a substantial drop in temperature in said second zone from that maintaining in said first zone and thereby producing intense ebullition and distillation of said liquid and release of vapors entrained therein; and thereupon withdrawing the released vapors from said second zone.

2. A method of heat-treating potable liquids subject to harmful change by excessive heat content of steam which is admixed therewith, comprising in a continuous, once-through process, introducing steam in a first heating zone at a point near the start thereof, and by said steam maintaining a pressure in said zone so chosen that the range of the boiling point of water corresponding to the selected pressure will extend from about 212° F. to about 250° F., gently and intimately intermingling in said first zone near the start thereof the liquid to be treated with a sufficiency of steam, which steam is saturated at the moment of its introduction into said first zone and at the super-atmospheric pressure and at the temperature prevailing in said zone, and by said admixture of steam with liquid, raising the temperature of said liquid, during its passage through said first zone, to approximately that temperature which the saturated steam has at the moment of its introduction into said first zone; then leading said liquid at its elevated temperature, together with any excess steam, from the outlet end of said first zone into the inlet end of a second zone, and there subjecting said liquid and any excess steam to a reduced pressure which is maintained in said second zone, such that a temperature drop of approximately 50° F. from that maintaining in said first zone will be occasioned in the second zone, and there subjecting said liquid and condensed moisture, together with any excess steam entrained therein, to intense ebullition, thereby flashing at least part of the condensed moisture into steam, and drawing-off and discharging the vapors released during such ebullition.

3. A method of heat-treating potable liquids subject to harmful change by excessive heat content of steam which is admixed therewith, comprising, in a continuous process, introducing steam in a first, heating zone at a point near the start thereof and by said steam maintaining a pressure in said zone so chosen that the range of the boiling point of water corresponding to the selected pressure will extend from about 212° F. to about 250° F., gently and intimately intermingling in said first zone near the start thereof the liquid to be treated with a sufficiency of steam, which steam is saturated at the moment of its introduction into said first zone and at the super-atmospheric pressure and at the temperature prevailing in said zone, and by said admixture of steam with liquid, raising the temperature of said liquid, during its passage through said first zone, to approximately that temperature which the saturated steam has at the moment of its introduction into said first zone; then leading said liquid at its elevated temperature, together with any excess steam, from the outlet end of said first zone into the inlet end of a second zone, and there subjecting said liquid and any excess steam to a reduced pressure which is maintained in said second zone, such that a temperature drop of approximately 50° F. from that maintaining in said first zone will be occasioned in the second zone; and there subjecting said liquid and condensed moisture together with any excess steam entrained therein, to intense ebullition, thereby flashing at least part of the condensed moisture into steam, and vacuum-drawing-off the vapors released during such ebullition in counter-flow to the path of the said liquid traversing said second zone.

4. A continuous, once-through method of pasteurizing, sterilizing and steam-distilling potable liquids subject to harmful change by excessive heat content of steam which is admixed therewith, comprising maintaining, by the introduction of steam thereinto near the inlet end thereof, a first, heat-exchange zone maintained at a super-atmospheric pressure and at a temperature equal to the boiling point of water at said selected pressure; preliminarily adjusting the temperature of live steam, prior to intermingling it with said liquid, so that it is saturated at and immediately after the moment when it is intermingled with said liquid; passing the liquid to be treated into said first zone and there effectively pasteurizing it within said first zone without appreciably injuring the body thereof, by gently and intimately intermixing the liquid and the temperature-adjusted steam in, and near the inlet end of said first zone, and thereafter passing said mixture of liquid and steam through said first zone; and then passing the treated liquid, together with any excess of steam entrained therein, from the outlet end of the said first zone to the inlet end of a second zone maintained at a pressure sufficiently lower than that maintaining in said first zone, that the temperature of said liquid drops approximately 50° F. from that maintaining in said first zone; and drawing off and discharging such vapors as are released in said second zone.

5. A continuous, once-through method of pasteurizing, sterilizing, and steam-distilling potable liquids subject to harmful change by excessive heat content of steam which is admixed therewith, comprising gently and intimately intermingling the liquid to be treated with steam which has been preliminarily adjusted as to temperature, in a first zone which is maintained at a super-atmospheric pressure and at a temperature of approximately 228° F., which temperature corresponds to the boiling point of water at the selected pressure, preliminarily adjusting the temperature of said steam before admixing it with said liquid by introducing into the live steam a requisite supply of water to absorb super-heat and thereby correct the temperature of said steam to that of boiling water at the selected operating pressure, the said gentle intermingling of liquid and temperature-adjusted steam raising the temperature of the liquid undergoing treatment in said first zone to the temperature of said adjusted steam; then passing the liquid, together with any surplus steam which may be entrained therein, into a second zone maintained under a pressure sufficiently lower than that maintaining in said first zone to produce an approximately 50° F. drop in temperature from that in said first zone, thereby producing intense ebullition of the liquid and release of entrained vapors therefrom; and thereupon withdrawing the released vapors from said second zone.

HENRY LAMONT MURRAY.

REFERENCES CITED

The following references are of record in the file of this patent:

UNITED STATES PATENTS

| Number | Name | Date |
| --- | --- | --- |
| 2,003,454 | Murray | June 4, 1935 |
| 2,022,420 | Hammer et al. | Nov. 26, 1935 |
| 2,091,606 | Murray | Aug. 31, 1937 |
| 2,130,643 | Hammer et al. | Sept. 20, 1938 |